United States Patent [19]

Vandling

[11] 4,022,970
[45] May 10, 1977

[54] FACSIMILE RECEIVER WITH IMPROVED FM DEMODULATOR

[75] Inventor: John M. Vandling, Pleasantville, N.Y.

[73] Assignee: Exxon Research and Engineering Company, Linden, N.J.

[22] Filed: Sept. 26, 1975

[21] Appl. No.: 617,105

[52] U.S. Cl. .......................... 358/298; 178/DIG. 7; 329/128
[51] Int. Cl.² ................... H04N 1/40; H03D 3/00
[58] Field of Search .............. 178/6, 7.3 R, 6.6 R, 178/DIG. 7; 329/104, 107, 110, 128; 328/38; 307/220

[56] References Cited

UNITED STATES PATENTS 3,911,207  10/1975  Barwick ................................ 178/6
3,916,098  10/1975  Vandling ......................... 178/7.3 D

OTHER PUBLICATIONS

Katsman, "Frequency Doubler for Low Frequencies", *Instrum. J Exp. Tech.* (USA), vol. 16, No. 2, pt. 1 (Mar.–Apr. 1973) (publ. Aug. 1973) pp. 479–480.

*Primary Examiner*—John C. Martin
*Attorney, Agent, or Firm*—Norman L. Norris

[57] ABSTRACT

FM signals within a predetermined bandwidth representing light-dark variations in a document are transmitted over a communications network to a facsimile receiver. The FM signals are applied to differentiating and frequency doubling means so as to generate trigger signals with substantially equal amplitude and width for application to a single shot multivibrator. Reset means coupled directly to the input of the single shot multivibrator are responsive to the trigger pulses to reset the single shot multivibrator to the astable state when the frequency of the trigger pulses is sufficiently high that trigger pulses occur while the multivibrator is in a previously initiated astable state. An average DC voltage detector is connected to the output of the multivibrator such that the average DC voltage represents the ratio of the astable state duration to the stable state duration.

10 Claims, 3 Drawing Figures

FACSIMILE RECEIVER WITH IMPROVED FM DEMODULATOR

BACKGROUND OF THE INVENTION

This invention relates to facsimile systems comprising a tramsmitter, a receiver and a communications network therebetween. More particularly, this invention relates to a system wherein a document is scanned in a facsimile transmitter to generate electrical information-bearing signals representing the light-dark variations in the document being scanned. These information-bearing signals are then transmitted over the communications network to a facsimile receiver where the information-bearing signals are converted to marks or images on a copy medium so as to form a copy which is a reasonable facsimile of the original document.

In several commercially available facsimile systems, the information-bearing signals which are transmitted over the comunication network are FM (frequency modulated) signals. In general, the signals lie in a band between 1500 and 2400 Hz. which represents a portion of the audio range which is transmitted over ordinary telephone lines. Where this frequency range is utilized, the 1500 Hz. signal usually represents a white level, the 2400 Hz. signal represents a black level and signals in the frequency range between 1500 and 2400 Hz. represent varying degrees of gray. In the alternative, the gray scale may be eliminated or reduced such that frequencies in the lower portion of the bandwidth toward 1700 Hz. and below may represent white and frequencies in the upper portion of the bandwidth toward 2200 Hz. and above may represent black.

One low cost, and extremely effective technique for demodulation of the FM signals, involves the use of one or more single shot multivibrators. As shown in U.S. copending patent application Ser. No. 417,797 filed Nov. 21, 1973, now U.S. Pat. No. 3,911,207, and application Ser. No. 440,392 filed Feb. 7, 1974, now U.S. Pat. No. 3,916,098, a single shot multivibrator is triggered into its astable state in response to trigger pulses generated for each zero crossing of the FM signals. When the received FM signals approach the lower portion of the FM bandwidth (1500 Hz.), the trigger pulses corresponding to the zero axis crossing of the FM signals triggers or sets the single shot multivibrator to the astable state such that the astable state duration or duty cycle of the multivibrator represents a lesser portion of the multivibrator cycle which includes the stable state duration. When the frequency of the FM signals approaches the other end of the bandwidth (approximately or equal to 2400 Hz.), the astable state duration or duty cycle of the multivibrator now represents a larger portion of the multivibrator cycle. This variation in ratio in the duty cycle or astable state duration to the stable state duration may be utilized to control the writing at the facsimile receiver by detecting the average DC value from the output of the multivibrator. When the average DC value is relatively small, corresponding to the reception of 1500 Hz. signals, the average DC voltage is utilized to control the writing mechanism of the facsimile receiver so as to produce white on the copy medium. When the FM signal has a frequency of 2400 Hz. representing black, the average DC value which is relatively high is utilized to control the writing mechanism in the receiver so as to produce black on the copy medium.

Certain disturbances in the FM carrier signal may produce zero axis crossings at a rate corresponding to frequencies in excess of the 2400 Hz. which can produce errors on the copy medium. One particularly likely source of such a disturbance is acoustic ringing where an acoustic coupler is utilized between the communications network or telephone line and the receiver itself. In order to prevent the creation of white holes in the copy during the reception of black signals, the aforesaid application Ser. No. 440,392 includes means for resetting the single shot multivibrator in response to disturbances which occur while the multivibrator is in the astable state thereby reinitiating the astable state so as to prevent the formation of white holes in black copy.

As disclosed in the aforesaid application Ser. No. 440,392, the single shot multivibrator comprises a voltage comparator having one input adapted to be coupled to a source of trigger signals and another input coupled to a first tap on a voltage divider connected between a first reference voltage and a second reference voltage. When the one input to the comparator exceeds a predetermined level represented by the voltage at the first tap of the voltage divider, a flip-flop coupled to the output of the voltage comparator is reset thereby applying an appropriate control voltage to the base of a transistor which is rendered nonconductive so as to permit the timing capacitor of the single shot multivibrator to charge during the astable state. When the charge on the timing capacitor reaches a predetermined level as determined by a comparator which is connected to another tap on the voltage divider, the timing capacitor is discharged. By providing a reset means associated with the single shot multivibrator having an input indirectly connected to the input to the single shot multivibrator through a capacitor, the transistor which controls the charging of the timing capacitor may be rendered conductive in response to any disturbance which appears to be or resembles a trigger pulse applied to the input of the single shot multivibrator. This in turn reinitiates the charging of the timing capacitor so as to eliminate the creation of any white holes in black copy.

The trigger pulses which are applied to the input of the single shot multivibrator and the reset circuitry of the prior art facsimile transceivers such as that shown in the aforesaid application Ser. No. 440,392 are shown in the aforesaid copending application Ser. No. 417,797. More particularly, the trigger pulses have been generated by RC circuitry for differentiating the FM signals so as to create spikes of opposite polarity at axis crossing times of the FM signals. The output from the RC circuitry is then applied to a frequency doubling circuit comprising a single semiconductive path through the collector-emitter circuit of a transistor connected in series with a voltage dropping impedance beween a first reference voltage and a second reference voltage. The transistor is rendered conductive in response to the spikes of opposite polarities by the use of oppositely poled diodes with one connected to the base of the transistor and the other connected to the emitter of the transistor. When a positive going spike is applied to the one diode connected to the base of the transistor, the transistor is rendered conductive so as to pull the collector of the transistor toward the second voltage reference level. Similarly, a negative going spike applied to the other diode will lower the voltage at the emitter of the transistor so as to again render the transistor conductive and thereby pull the collector and input to the single shot multivibrator toward the second reference potential.

Although the above-described frequency doubling circuit performs adequately, the trigger pulses which are generated at the output and applied to the single shot multivibrator and the reset circuitry are of somewhat different width and amplitude depending upon whether a positive going spike or a negative going spike initiates the trigger pulse. In addition, the edges of the pulses generated by the frequency doubling circuit do not have a particularly steep slope. These characteristics of the trigger pulses can lead to a failure in the reset circuitry. It is for this reason that the capacitor has been provided for the indirect connection between the input to the comparator and the transistor of the reset circuitry.

U.S. Pat. No. 3,467,772 — Crane discloses the use of a pair of parallel single shot multivibrator circuits which are triggered by pulses having a frequency double the frequency of the FM signals. However, there is no disclosure of the particular frequency doubler circuit. Moreover, there is no reset circuitry disclosed in the Crane patent which would require trigger pulses characterized by uniform width, uniform amplitude and fast or steep leading and trailing edges.

SUMMARY OF THE INVENTION

It is an object of this invention to provide an improved facsimile receiver capable of faithfully reproducing a document.

In accordance with this object, the facsimile receiver comprises means for generating trigger pulses having a frequency proportional to the frequency of received FM signals representing light-dark variations in a document. Timing means are coupled to the trigger pulse generating means for timing out periods of predetermined duration where the timing periods are initiated in response to the trigger pulses. Detector means are coupled to the output of the timing means for generating a writing control signal varying as a function of the ratio of timing periods to the time between timing periods. Writing means are coupled to the output of the detector means for marking on a copy medium so as to reproduce the light-dark variatons of the document of the copy medium in response to the writing control signal.

In further accordance with this object of the invention, the receiver may comprise reset means coupled to the timing means in the output of the trigger pulse generating means for resetting the timing means in response to trigger pulses during the timing periods.

It is another specific object of this invention to provide trigger pulses which will reliably actuate the timing means and the reset means.

It is a more specific object to generate trigger pulses of uniform width and amplitude and having fast or steep leading and trailing edges so as to reliably actuate the timing means and the reset means.

In accordance with this specific object of the invention, the trigger pulse generating means comprises means for generating pulses of opposite polarity having a frequency substantially proportional to the received FM signals. A pair of parallel semiconduction paths are connected in series with impedance means between a first reference voltage and a second reference voltage. The parallel semiconductive paths are connected to the means for generating pulses of opposite polarity so as to render the semiconductive paths alternately conductive in response to the pulses of opposite polarity thereby generating trigger pulses of the same polarity at the impedance means.

In the preferred embodiment, the parallel semiconductive paths comprise substantially the same impedance. This is accomplished by a first transistor comprising a collector-emitter circuit connected between the impedance means and the second voltage reference level with a base connected to the output of the means for generating pulses of opposite polarity. A second transistor comprises a collector-emitter circuit connected between the impedance means and the means for generating pulses of opposite polarity and having a base connected to the second reference voltage level. A diode is connected between the collector-emitter circuit of the second transistor and the impedance means to assure substantially equal voltage across the parallel conductive paths.

DETAILED DESCRIPTION OF A PREFERRED EMBODIMENT

Figure 1:
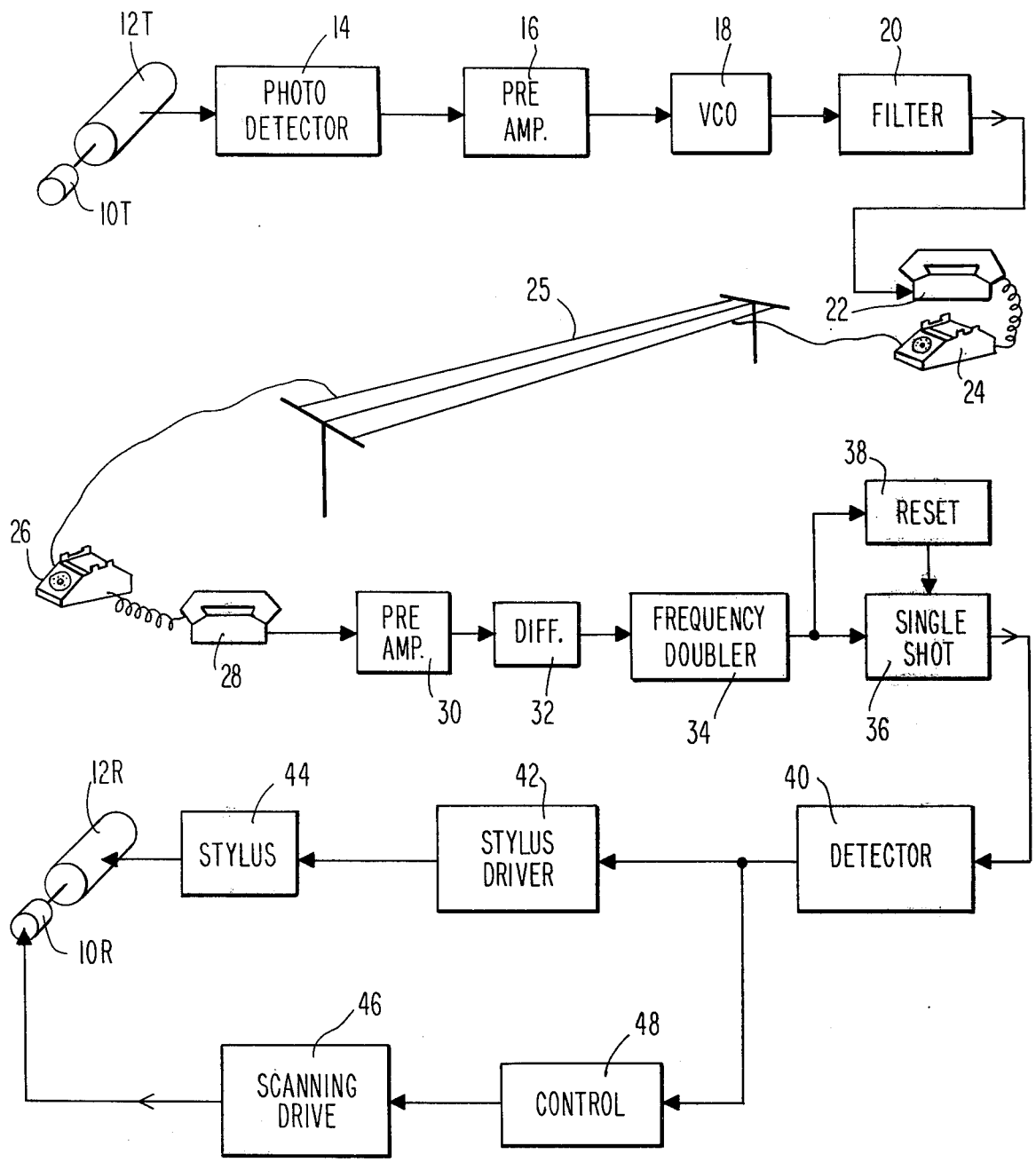
FIG. 1 is a block diagram of a facsimile system wherein the invention is utilized.

Referring now to the facsimile system shown in FIG. 1, a facsimile transmitter comprises a drum 12T rotated by a motor 10T so as to create a relative scanning movement between a document carried by the drum 12T and a scanning head not shown. As the scanning head is advanced axially along the drum 12T and the drum rotates about its axis, successive paths on the document are illuminated and variations in light intensity due to the reflectivity of the document are scanned by a photodetector 14. The photodetector 14 then converts these variations in light intensity which are a function of the reflectivity of the scanned document into electrical signals. These electrical signals are amplified in a preamplifier 16 and utilized to control a VCO (voltage controlled oscillator) 18 to generate FM (frequency modulated) signals representing the information content of the document carried by the drum 12T. The frequency modulated signals are then conditioned by a signal conditioning network 20 before being applied to an acoustical coupler 22 which is associated with a conventional telephone handset 24.

The FM carrier is transmitted by suitable means such as conventional telephone lines 25 to a facsimile receiver which is coupled to another conventional handset 26 and an associated acoustical coupler 28.

In accordance with this invention, the FM carrier which is amplified by the preamplifier 30 is applied to an improved circuitry for generating trigger pulses characterized by substantially uniform pulse width and amplitude as well as fast or steep leading and trailing edges. The new and improved trigger pulse circuitry includes a differentiating circuit 32 which generates spikes of opposite polarity in response to each zero axis crossing and a frequency doubling circuit 34.

In further accordance with this invention, the output of the frequency doubling circuit 34 is applied to a single shot multivibrator 36 having an input directly connected to reset circuitry 38. The trigger pulses of uniform width and amplitude having steep leading and trailing edges reliably reset the single shot multivibrator 36 in response to the output of the reset circuitry 38 even through the single shot multivibrator is in the astable state. In other words, the astable state of the single shot multivibrator 36 will continue at least a predetermined length of time after each trigger pulse generated at the output of the frequency doubler circuit 34.

The output from the single shot multivibrator 36 is applied to a detector circuit 40 for determining the average DC value of the single shot output. The writing control signal generated at the output of the detector 40 is then applied to a stylus driver 42 for a stylus 44 associated with a movable head (not shown) juxtaposed to a copy medium carried by a drum 12R. Relative movement between the copy medium and the head is achieved by rotating the drum 12R by means of a motor 10R and advancing the head axially along the drum. The motor 10R is driven by a scanning drive circuit 46 which initiates rotation of the drum 10R in response to the output from the the detector 40 by means of a control circuit 48.

The differentiating circuit 32, the frequency doubling circuit 34, the single shot circuit 36 and the reset circuit 38 will now be described in detail with reference to FIG. 2. As shown therein, the differentiating circuit 32 comprises an RC network including a capacitor 102 connected to the output of the preamplifier 30 and a resistor 104 connected to ground. The output from the differentiating circuit 32 at the junction of the capacitor 102 and the resistor 104 is a series of spikes which are of opposite alternating polarity and are coincident with the zero axis crossing of the FM carrier.

In accordance with this invention, the spikes from the differentiating circuit 32 are applied to the frequency doubling circuit 34 which comprises a pair of alternately conductive parallel semiconductive paths which are connected through a voltage dropping impedance between a first reference voltage level and a second reference voltage level. More particularly, the doubling circuit 34 comprises a first transistor 106 having a collector-emitter circuit connected in series with a voltage dropping resistor 108 between a +8 volt power supply and ground. The base of the transistor 106 is connected to the output from the differentiating circuit 32 so as to render the collector-emitter circuit of the transistor 106 conductive in response to positive spikes. Conduction of the collector-emitter circuit of the transistor 106 pulls the junction between the impedance 108 and the collector of the transistor 106 to ground thereby generating a trigger pulse which is applied to the single shot multivibrator 36 and the reset circuit 38.

The second semiconductive path of the doubling circuit 34 comprises the collector emitter base circuit of a transistor 110 which is connected in series with a compensating diode 112 between the voltage dropping impedance 108 and ground. When a negative going spike from the differentiating circuit 32 is applied to the emitter of the transistor 110, the base collector emitter circuit is rendered conductive so as to pull the junction of the diode 112 and the voltage dropping resistor 108 to ground thereby generating a trigger pulse which is applied to the single shot multivibrator 36 and the reset circuit 38. The compensating diode 112 assures that the amplitudes of the trigger pulses are substantially equal by providing a voltage drop which, when algebraically added to the voltage drop across the base-emitter circuit of the transistor 110, substantially equals the voltage drop across the collector-emitter circuit of the transistor 106.

In a particularly preferred embodiment of the invention, the transistors 106 and 110 comprise 2N4123 transistors which, when saturated, have a collector-emitter voltage drop substantially equal to 0.2 volts. When the transistor 110 is saturated with the base tied to ground and the emitter driven negative, the collector voltage is substantially −0.6 volts with respect to ground and the emitter voltage is substantially −0.8 volts with respect to ground. By providing a voltage drop of 0.6 volts from the anode to the cathode of the diode 112, the voltage at the junction of the diode 112 and the voltage dropping impedance 108 is approximately 0 volts with respect to ground. Thus, the trigger pulses which are generated in response to oppositely poled spikes from the differentiating circuit 32 are of substantially equal amplitude. The pulses generated by the doubler circuit 34 are also of substantially equal width with steep leading and trailing edges.

Figure 2:
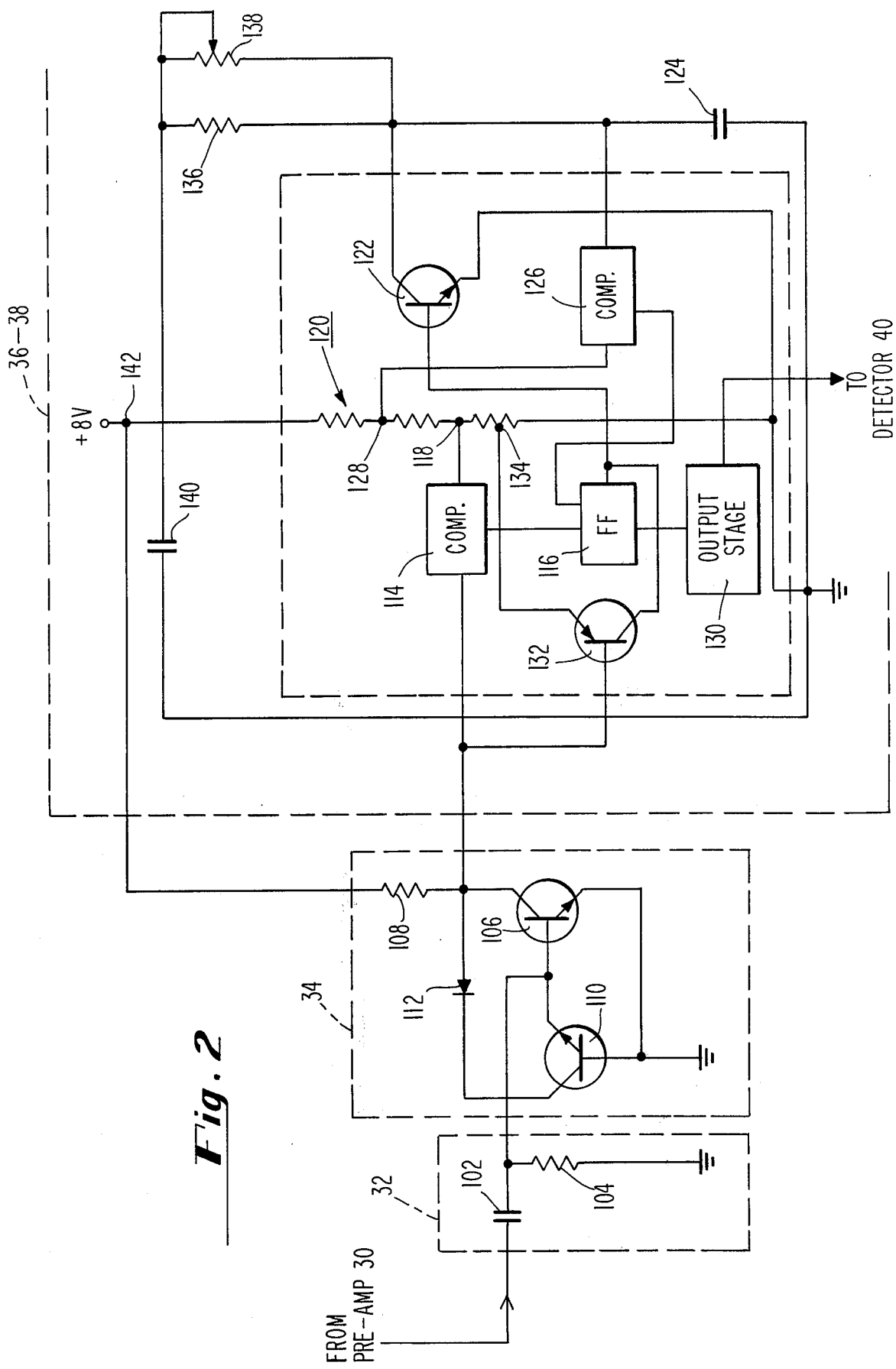
FIG. 2 is a schematic circuit diagram of a preferred embodiment of the invention.

The single shot multivibrator circuit as shown in FIG. 2 comprises a comparator 114 having an output coupled to a flip-flop 116, one input coupled to the output of the frequency doubling circuit 34 and the other input coupled to a tap 118 in a resistive voltage divider 120 so as to provide reference for comparison with the input trigger pulses. When a trigger pulse is applied to the first input of the comparator 114, the output from the comparator sets the flip-flop 116. Simultaneously, the flip-flop 116 removes a positive voltage from the base of a switching transistor 122 so as to permit a timing capacitor 124 coupled between the collector of the transistor 122 and ground to charge.

The single shot multivibrator further comprises a comparator 126 having one input coupled to the capacitor 124 and another input suitably referenced by the voltage divider 120 at a tap 128. When the charge on the timing capacitor 124 reaches a predetermined level, the comparator 126 will produce an output so as to reset the flip-flop 116 and thereby apply a positive voltage to the base of the switching transistor 122 discharging the capacitor 124. The output from the flip-flop 116 is applied to an output stage 130 which produces a voltage which is detected by the average DC voltage detector 40.

In accordance with another important aspect of this invention, the input to the reset circuitry at the base of a transistor 132 is connected directly to the input of the single shot multivibrator circuit 36. The emitter of the transistor 132 is coupled to a tap 134 on a voltage divider 120 such that a negative voltage applied to the base of the transistor 132 will cause the base-collector junction of the transistor 132 to conduct and this in turn will remove the forward bias on the base of the transistor 122 so as to cause the transistor 122 to become nonconductive thus initiating charging of the timing capacitor 124 during presence of a trigger pulse. It will be observed that the trigger pulses which substantially approach ground, i.e., within 0.2 volts of ground, are capable of rendering the transistor 132 conductive even though the emitter of the transistor is biased relatively close to ground by the tap 134 on the voltage divider 120. After the trigger pulses have passed, the transistors 122 and 132 are rendered nonconductive and the capacitor 124 begins to charge again through resistors 136 and 138. The resistor 138 comprises a potentiometer which is adjustable so as to permit an adjustment in the timing period of the multivibrator.

Assuming a detector circuit designed to demodulate FM signals within the bandwidth from 1500 to, but not exceeding 1400 Hz., the astable state duration or astable pulse width may not exceed 1/4800 where 4800 is the frequency (in Hz.) of the zero axis crossing and trigger pulses for an FM carrier frequency of 2400 Hz., i.e., the astable pulse width may not exceed 209 microseconds. In the circuit of FIG. 2, the astable pulse width is established by the component values of the resistor 136, the resistor 138, the capacitor 124 and the tap setting on the resistor 138.

For further details concerning the multivibrator, reference is made to the aforesaid copending application Ser. No. 440,392, which is incorporated herein by reference. Note that the multivibrator shown in FIG. 2 in block formed by broken lines may comprise an integrated circuit such as an NE555 chip manufactured by Signetics Corporation. In such a chip,, the emitter of the transistor 132 would be connected to a voltage source other than that provided by the voltage divider 120.

Figure 3:
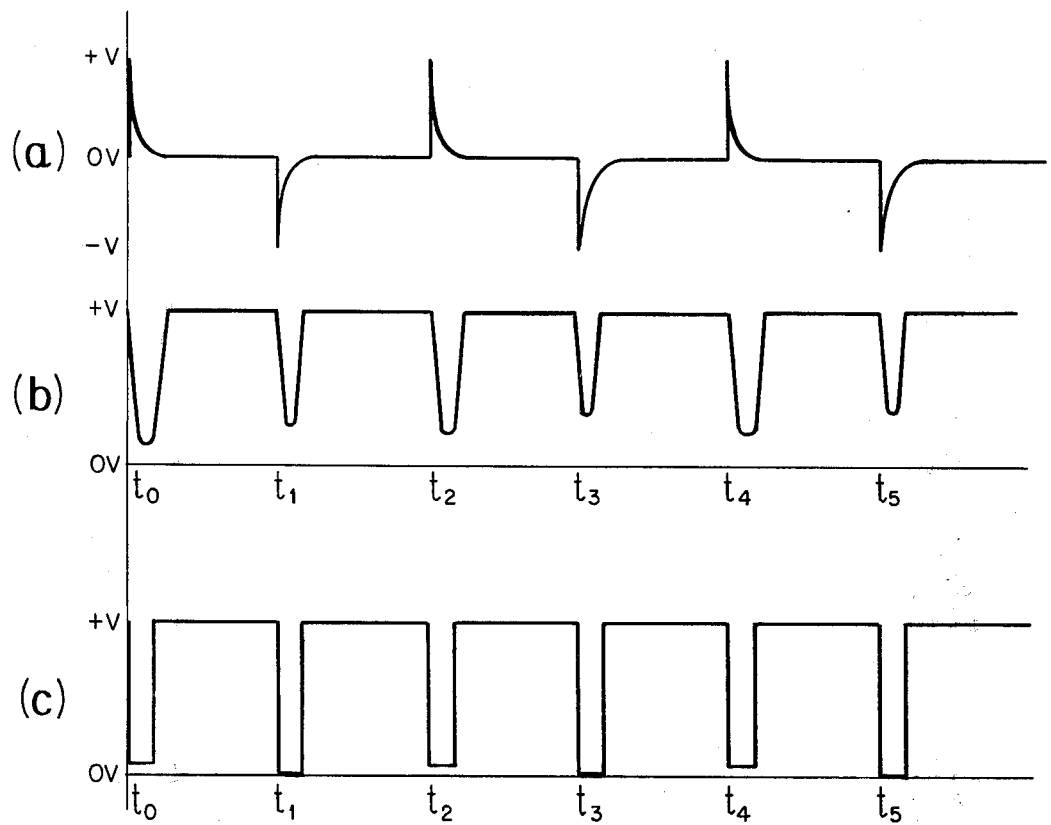
FIG. 3 is a waveform diagram comparing the trigger pulses generated by the prior art circuitry and the trigger pulses generated by the circuitry of this invention

In order to provide a more graphic explanation of the advantages to be derived from this invention, reference will now be made to the waveforms shown in FIG. 3.

Waveform a depicts the pulses of opposite polarity generated at axis crossing times of the FM carrier by the differentiating circuit 32. Waveform b depicts the trigger pulses which are generated by the prior art frequency doubling circuit disclosed in the aforesaid application Ser. No. 417,797 in response to the pulses of wave form a. It will be noted that the trigger pulses are of different amplitude and width. The trigger pulses generated at times $t_0$, $t_2$, and $t_4$ more closely approach 0 volts than the trigger pulses at times $t_1$, $t_3$ and $t_5$. However, none of the trigger pulses reach a sufficiently low voltage so as to reset the multivibrator as shown in FIG. 2 since the input to the reset circuitry, namely the base of the transistor 132, never becomes more negative than the emitter of the transistor 132 which is connected to the tap 134 of the voltage divider 120. Moreover, the leading and trailing edges of the pulses are slow.

In contrast, the trigger pulses generated by the frequency doubling circuit of this invention as shown in waveform c are of substantially equal amplitude and width, i.e., the pulses at times $t_0$, $t_2$ and $t_4$ are within 0.2 volts of 0 volts while the pulses at times $t_1$, $t_3$ and $t_5$ actually reach 0 volts. It will also be noted that the leading and trailing edges of the pulses in waveform c are substantially steeper than those of waveform b. As a result, the pulses of waveform c assure that, even though the reset circuitry is connected directly to the input of the multivibrator circuit, the multivibrator will be reset in response to any disturbance on the line so as to avoid any white holes in the black copy.

Although portions of the transmitter and receiving circuitry depicted in FIG. 1 have not been shown in detail herein, such circuitry is shown in detail in aforesaid copending application Ser. No. 417,797 which is incorporated herein by reference.

Although a particular embodiment of the invention has been shown and described and various modifications have been suggested, it will be understood that the true spirit and scope of the invention as set forth in the appended claims embrace other modifications and embodiments which will occur to those of ordinary skill in the art.

I claim:

1. In a facsimile receiver for producing a copy at a receiving location in response to signals representing light-dark variations in a document at a remote transmitting location, said receiver comprising means for generating trigger pulses having a frequency proportional to the frequency of received FM signals representing light-dark variations in a document, timing means coupled to said trigger pulse generating means for timing periods of predetermined duration, said timing periods being initiated in response to said trigger pulses, detector means coupled to the output of said timing means for generating a writing control signal varying as a function of the ratio of timing periods to the time between said timing periods, and writing means coupled to the output of said detector means for marking on a copy medium to reproduce light-dark variations of the document on the copy medium in response to said writing control signal, the improvement residing in said trigger pulse generating means comprising:

means for generating spaced pulses of opposite polarity having a frequency substantially proportional to the frequency of the received signal;
a first reference voltage means;
a second reference voltage means;
impedance means; and
a pair of parallel semiconductive paths connected in series with said impedance means between said first reference voltage means and said second reference voltage means, said parallel semiconductive paths being connected to said means for generating pulses of opposite polarity so as to be alternately conductive in response to pulses of opposite polarity thereby generating trigger pulses of the same polarity at said impedance means having a voltage excursion substantially independent of the amplitude of said spaced pulses of opposite polarity.

2. The facsimile receiver of claim 1 wherein alternate conduction of said semiconductive paths produces pulses of substantially the same amplitude.

3. The facsimile receiver of claim 2 wherein said semiconductive paths are formed by a pair of transistors.

4. The facsimile receiver of claim 3 wherein the first of said pair of transistors comprises a collector-emitter circuit connected between said impedance means and said second voltage reference and a base connected to said means for generating pulses of opposite polarity, the second of said pair of transistors comprising a collector-emitter circuit connected between said impedance means and said means for generating pulses of opposite polarity and a base connected to said second voltage reference.

5. In a facsimile receiver comprising FM demodulator means including a first reference voltage, a second reference voltage, a voltage divider connected between said first reference voltage and said second reference voltage, a voltage comparator having one input adapted to be coupled to a source of trigger signals and another input adapted to be coupled to a first tap on said voltage divider between said first reference voltage and said second reference voltage, a flip-flop coupled to the output of said voltage comparator and adapted to change state in response to the output of said voltage comparator, a timing capacitor automatically charged to a predetermined level in response to the state of said flip-flop, reset switch means coupled to a second tap at said voltage divider between said first tap and said second reference voltage for discharging said capacitor, the improvement comprising:

means for generating trigger pulses having a frequency substantially proportional to the frequency of FM signals received by said receiver, said trigger pulses having a predetermined voltage excursion substantially independent of the received input signal; and means for connecting said means for generating trigger pulses directly to said one input of said comparator and said reset switch means, said voltage excursion of said trigger pulses assuring that said reset switch means is actuated in response to each of said trigger pulses.

6. The facsimile receiver of claim 5 wherein said voltage excursion of said trigger pulses approaches said second reference voltage so as to be substantially equal thereto.

7. The facsimile receiver of claim 5 wherein said means for generating trigger pulses comprises;

means for differentiating said FM signals so as to generate spaced pulses of opposite polarity;

a voltage dropping impedance connected to said first reference voltage;

a first semiconductive switching means connected between said voltage dropping impedance and said second reference voltage;

a second semiconductive switching means connected between said voltage dropping impedance and said second reference voltage; and said first and second semiconductive switching means being alternately responsive to signals from said differentiating means for generating said trigger pulses of predetermined voltage excursion.

8. The facsimile receiver of claim 7 wherein said first semiconductive switching means comprises a first transistor and said second semiconductive switching means comprises a second transistor.

9. The facsimile receiver of claim 8 wherein said first transistor comprises a collector-emitter circuit connected between said voltage dropping impedance and said second reference voltage and a base connected to said differentiating means and said second transistor comprises a collector-emitter circuit connected between said voltage dropping impedance and said differentiating means and a base connected to said second reference voltage.

10. The facsimile receiver of claim 9 comprising a diode connected between the collector-emitter circuit of said second transistor and said voltage dropping impedance.

* * * * *